United States Patent
Belitz et al.

(10) Patent No.: US 10,883,695 B2
(45) Date of Patent: Jan. 5, 2021

(54) MODULAR FLEXIBLE LIGHT BAR

(71) Applicant: Federal Signal Corporation, Oak Brook, IL (US)

(72) Inventors: Duane P. Belitz, Frankfort, IL (US); Tim Skertich, Jr., Dyer, IN (US); Robert A. Czajkowski, Tinley Park, IL (US); Paul M. Gergets, Saint John, IN (US); Jeffery M. Loftus, Tinley Park, IL (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 16/426,292

(22) Filed: May 30, 2019

(65) Prior Publication Data
US 2019/0368680 A1    Dec. 5, 2019

Related U.S. Application Data

(60) Provisional application No. 62/677,840, filed on May 30, 2018.

(51) Int. Cl.
| | |
|---|---|
| *F21S 43/15* | (2018.01) |
| *B60Q 3/208* | (2017.01) |
| *B60Q 3/51* | (2017.01) |
| *B60Q 3/80* | (2017.01) |
| *F21V 21/14* | (2006.01) |
| *F21V 23/00* | (2015.01) |

(Continued)

(52) U.S. Cl.
CPC ............. *F21S 43/15* (2018.01); *B60Q 3/208* (2017.02); *B60Q 3/51* (2017.02); *B60Q 3/80* (2017.02); *F21V 21/14* (2013.01); *F21V 23/003* (2013.01); *B60Q 1/46* (2013.01); *B60Q 3/10* (2017.02); *F21Y 2103/10* (2016.08)

(58) Field of Classification Search
CPC .......... F21S 43/15; B60Q 3/208; B60Q 3/51; B60Q 3/80; B60Q 3/10; B60Q 1/46; F21V 21/14; F21V 23/003; F21Y 2103/10
See application file for complete search history.

(56) References Cited

U.S. PATENT DOCUMENTS

| | | | |
|---|---|---|---|
| 6,511,216 B2 | 1/2003 | Strickland | |
| 6,764,210 B2 * | 7/2004 | Akiyama | ............... B60Q 1/302 340/479 |

(Continued)

FOREIGN PATENT DOCUMENTS

| | | |
|---|---|---|
| EP | 1277615 A1 | 1/2003 |
| WO | 0058128 A1 | 10/2000 |
| WO | 03083811 A1 | 10/2003 |

OTHER PUBLICATIONS

International Search Report and Written Opinion in PCT/US2019/034654 dated Jul. 24, 2019, 17 pages.

*Primary Examiner* — Mary Ellen Bowman
(74) *Attorney, Agent, or Firm* — Merchant & Gould P.C.

(57) ABSTRACT

Light bars, and lighting systems and vehicles that include light bars. The light bars include a plurality of light emitting modules coupled together at flexible joints to allow a single light bar to be affixed to surfaces of varying curvatures, such as an interior window surface of a vehicle. The size of the light bar is easily customizable due to its modular nature. In some examples, a controller or other electronic element is adapted to detect a number and/or configuration of modules in a given light bar.

18 Claims, 9 Drawing Sheets

(51) Int. Cl.
*F21Y 103/10* (2016.01)
*B60Q 3/10* (2017.01)
*B60Q 1/46* (2006.01)

(56) References Cited

U.S. PATENT DOCUMENTS

| | | |
|---|---|---|
| 9,365,153 B2 | 6/2016 | Davis |
| 9,709,233 B2 | 7/2017 | Delourme et al. |
| 2004/0183449 A1 | 9/2004 | Monk |
| 2005/0018441 A1* | 1/2005 | Menke ............... B60Q 1/2611 362/493 |
| 2005/0152142 A1* | 7/2005 | Traynor ............... E01F 9/582 362/249.01 |
| 2008/0080203 A1 | 4/2008 | Neufeglise |
| 2016/0327247 A1 | 11/2016 | Leang |

\* cited by examiner

MODULAR FLEXIBLE LIGHT BAR

BACKGROUND

Vehicles, such as law enforcement, emergency, and construction vehicles, are commonly equipped with warning or other signal lights mounted to the vehicle. Such lights can generally be affixed, for example, so that they emit light through the vehicle's front windshield, or to the rear deck so that they emit light through the vehicle's rear window.

Typically, the components used to mount lights to vehicle interiors are customized to the particular vehicle configuration and to the particular mounting location on the vehicle.

SUMMARY

In general terms, the present disclosure is directed to modular flexible light bars that are adaptable to be affixed to vehicles of different configurations, and/or to different locations on such vehicles. In non-limiting examples, the modular flexible light bars of the present disclosure are adaptable to be affixed to an interior surface of a vehicle, such as a window (e.g., a windshield), a dashboard, a ceiling, or a rear deck within the cab or cabin of the vehicle.

Non-limiting examples of the vehicles to which the light bars of the present disclosure can be affixed include ambulances, fire trucks, police cars, tow trucks, construction vehicles, maintenance vehicles, other automobiles, aircraft, boats, locomotives, motorcycles, and personal transportation devices. It should also be appreciated that the light bars of the present disclosure can be used in non-vehicle applications, e.g., by affixing the light in or on a building or other physical object.

In some examples, a light bar of the present disclosure is easily adapted to be affixed to different vehicle configurations within the same class of vehicle (e.g., police cars of different makes and/or models), and/or vehicles of entirely different classes (e.g., an airplane and a fire truck). In some examples, a light bar of the present disclosure is easily adapted to be affixed to different surfaces of such vehicles. For example, a light bar of the present disclosure can be easily adapted for affixation to a rear window of a police car and to a front windshield of a tow truck.

According to certain aspects of the present disclosure, a light bar comprises a plurality of modules, each module including at least one light emitter, the light bar further comprising one or more flexible couplers, each of the one or more flexible couplers coupling a pair of adjacent modules of the plurality of modules.

In some examples, the light bar includes N of the modules and N-1 of the flexible couplers, where N is an integer greater than or equal to 2. In some examples N is any integer between 2 and 50, or more than 50. In some examples, N is no greater than 8. In a particular example, N is 6.

In some examples, each of the one or more flexible couplers comprises a hinge.

In some examples, the at least one light emitters in adjacent modules of the plurality of modules are electrically connected to each other and/or to a common electrical signal transceiving node via the flexible coupler coupling the adjacent modules, the flexible coupler comprising one or more electrically conductive elements, such as wires or conductive leads. In some examples, the at least one light emitters in adjacent modules of the plurality of modules are electrically connected to each other in a parallel circuit configuration.

In some examples, the one or more flexible couplers are made predominantly or entirely of a flexible, electrically conductive material.

In some examples, the one or more flexible couplers are made predominantly of a flexible, non-conductive material, such as a thermoplastic or thermosetting polymer. In certain non-limiting examples the one or more flexible couplers comprise one or more electrically conductive elements embedded in a polypropylene and/or polyethylene and/or polycarbonate insulator.

In some examples, the module housings and the couplers comprise the same material. In some examples, the module housings and the couplers comprise the same polymeric material, such as polypropylene, polyethylene, and/or polycarbonate.

In some examples, the plurality of modules are serially arranged in a single interconnected row.

In some examples, the plurality of modules are arranged and interconnected in two or more rows, forming a two dimensional array of the modules.

In some examples, the light bar comprises at least one controller adapted to control light emission by the light emitters.

In some examples, a controller remote from the light bar is adapted to control light emission by the light emitters. In some examples, a controller is located in a vehicle and hardwired to the light bar. In some examples, a controller is located in a vehicle and wirelessly communicative with the light bar, e.g., via a wireless communication network (e.g., Bluetooth® or an IOT (internet of things) network).

In some examples, the controller or another electronic component in communication with the light bar is adapted to detect a number and/or configuration of the plurality of modules in the light bar. In some examples, the light bar is modified (e.g., by an end user) to include just a single one of the modules, and a controller or another electronic component in communication with the single module is adapted to detect that the light bar includes just one module.

In some examples, the controller is adapted to detect and/or reconfigure or reassign reference numbers for locations of one or more modules in the light bar. For instance, should one or more modules in the light bar be moved, swapped, or replaced, the controller needs to identify each module and potentially re-assign the order by reference number.

In some examples, the controller is adapted to control a light emission flash pattern of the light emitters. In some examples, the light emission flash pattern partially depends on the number of modules and/or the configuration of the modules in the light bar detected, reconfigured, and/or reassigned by the controller or other electronic component.

In some examples, the light bar includes a row of the modules, the row defining a reference line when the one or more flexible couplers of the light bar are in an un-flexed or relaxed configuration.

In some examples, the row of modules is adapted to flex, with the flexible couplers, in at least one or in at least two degrees of freedom relative to the reference line.

In some examples, each of the one or more flexible couplers is adapted to flex or pivot to a flexed configuration such that at least one of the modules in the row is pivoted away from the reference line in a first reference plane, thereby defining a first degree of flex freedom of the light bar. In some examples, the first degree of flex freedom provided by the flexible couplers allows the modules to pivot away from the reference line by, e.g., at least 5°, 10°, 15°, 20°, 25°, 30°, 35°, 40°, 45°, 50°, 55°, 60°, 65°, 70° or more, without negatively impacting the operation of the light bar. In a particular example, the first degree of flex freedom provided by the flexible couplers allows the modules to pivot away from the reference line by up to 45°.

In some examples, each of the one or more flexible couplers is adapted, alternatively, or in addition, to flex or pivot to a flexed configuration such that at least one of the modules in the row is pivoted away from the reference line in a second reference plane, the second reference plane being perpendicular to the first reference plane, thereby defining a second degree of flex freedom of the light bar. In some examples, the second degree of flex freedom provided by the flexible couplers allows the modules to pivot away from the reference line by, e.g., at least 5°, 10°, 15°, 20°, 25°, 30°, 35°, 40°, 45° or more, without impacting the operation of the light bar. In a particular example, the second degree of flex freedom provided by the flexible couplers allows the modules to pivot away from the reference line by up to 10°.

The flexible couplers can be sufficiently resilient to flex and unflex between relaxed and flexed configurations about one or more degrees of flex freedom multiple times (e.g., at least 10 times, at least 50 times, at least 100 times, at least 500 times, at least 1,000 times, or more) without negatively impacting the light bar's operation. In a particular example, the flexible couplers can be sufficiently resilient to flex and unflex between relaxed and flexed configurations about one or more degrees of flex freedom at least 50 times.

In some examples, each of the modules includes a housing defining a bay that supports the one or more light emitters. The housing can be a substantially rigid structure made from, e.g., a substantially rigid plastic and/or metal material. The bay can be configured to propagate light from the light emitters in a primary propagation direction. The primary propagation direction can be selected such that, when the module is affixed to the interior of a vehicle, the primary propagation direction is parallel or substantially parallel (e.g., within +/−5° or +/−10° to the surface upon which the vehicle is positioned.

A cross-section of a module perpendicular to the reference line defines a cross-sectional perimeter of the module housing. In some examples, the cross-sectional perimeter defines or substantially defines a right triangle or a right triangle with one or more rounded corners, with the primary propagation direction being, in some examples perpendicular to the vertical side of the right triangle. In some examples, the size of the acute angles of the right triangle or rounded right triangle (or, in the case of another profile shape, the size of the angles or angles closest to the affixation surface of the module) are selected according to a class or group of classes of a vehicle or a type of vehicle surface through which the emitted light is to propagate. For substantially non-vertical windshields of police cars, for example, the module can be configured such that the acute angles are at or approximately 45°. In other examples, one of the acute angles can be anywhere from, e.g., 15° to 75°, or alternatively outside of this range.

The propagation face can include an affixation surface. In some examples, the affixation surface is adapted to be affixed to a surface of a vehicle, such as a windshield. In some examples, an affixation substance, such as an adhesive, is applied to the affixation surface for purposes of affixing the module to a surface such as a window. In some examples, a pealable layer is applied to the adhesive on the affixation surface, the pealable layer being removable to expose the adhesive when it is desired to affix the light bar to a surface. In some examples, an adhesive tape, such as a high-strength, double-sided acrylic foam tape (e.g., a VHB™ tape by 3M™) is applied to the affixation surfaces of the modules for purposes of affixing the modules to a surface of a vehicle.

In some examples, the affixation surface surrounds or at least partially surrounds an opening in the propagation face of the module. In some examples, the affixation surface surrounds or at least partially surrounds a transparent portion (e.g., a lens or transparent bay cover) of the propagation face.

In some examples, a light bar of the present disclosure comprising a plurality of modules is affixed to a curved surface, e.g., a window of car, such that affixation points of the modules substantially define a curve. In some examples the curve has a single radius of curvature. In other examples, the curve has multiple radii of curvature.

According to further aspects of the present disclosure, a vehicle is provided, the vehicle comprising one or more of the light bars described herein. In some examples, the vehicle also comprises a power source (e.g., a battery) for providing power to the light emitters of the one or more light bars. In some examples the vehicle also comprises at least one controller adapted to control light emission by the light emitters, the controller(s) being electronically coupled or couplable to the light bar or light bars. In some examples, the controller(s) (or another electronic component of the vehicle) is/are adapted to detect a number and/or configuration of modules in the light bar(s). In some examples, the vehicle also comprises at least one processor and a memory storing computer-readable instructions which, when executed by the at least one processor, causes the controller to retrieve information from the light bar (e.g., the number or configuration of modules) and/or provide control signals to the light bar for controlling illumination of the light emitters.

According to further aspects of the present disclosure, a system comprises a light bar described herein, a power source adapted to power the light bar, at least one controller for controlling light emission of the light emitters of the light bar, at least one processor, and a memory storing computer-readable instructions which, when executed by the at least one processor, cause the controller to retrieve information from the light bar (e.g., the number or configuration of modules) and/or provide control signals to the light bar for controlling illumination of the light emitters.

In some examples of the light bars of the present disclosure, the light emitters include one or more light emitting diodes (LEDs), incandescent lamps, halogen lamps, halide lamps, neon lamps, or fluorescent lamps.

In some examples of the light bars of the present disclosure, the light emitters can be configured to emit light beams of a plurality of different colors, wavelength bands, or sets of wavelength bands of visible light, where the differences in color, wavelength bands, or sets of wavelength bands are detectable by an average human eye. In some examples, the light bar comprises one or more lenses and/or filters, and the light emitters can be configured to emit light beams that pass through the lenses having a plurality of different colors, and/or to emit light beams that pass through one or more filters that filter the emitted light beams into a plurality of different colors or wavelength bands, where the differences in color or wavelength bands or sets of wavelength bands are detectable by an average human eye. In some examples of the light bars of the present disclosure, the light emitters can be configured to emit light beams of a single color or single wavelength band or single set of wavelength bands, and/or to emit light beams that pass through lenses of the same color and/or filters that filter the emitted light beams into a single color, a single wavelength band, or a single set of wavelength bands.

In some examples, the modules include one or more reflectors or reflecting surfaces to focus the direction or directions of light beam propagation from the light emitters.

In some examples, the modules include one or more lenses to spread out or focus light beam propagation from the light emitters.

DETAILED DESCRIPTION

Figure 1:
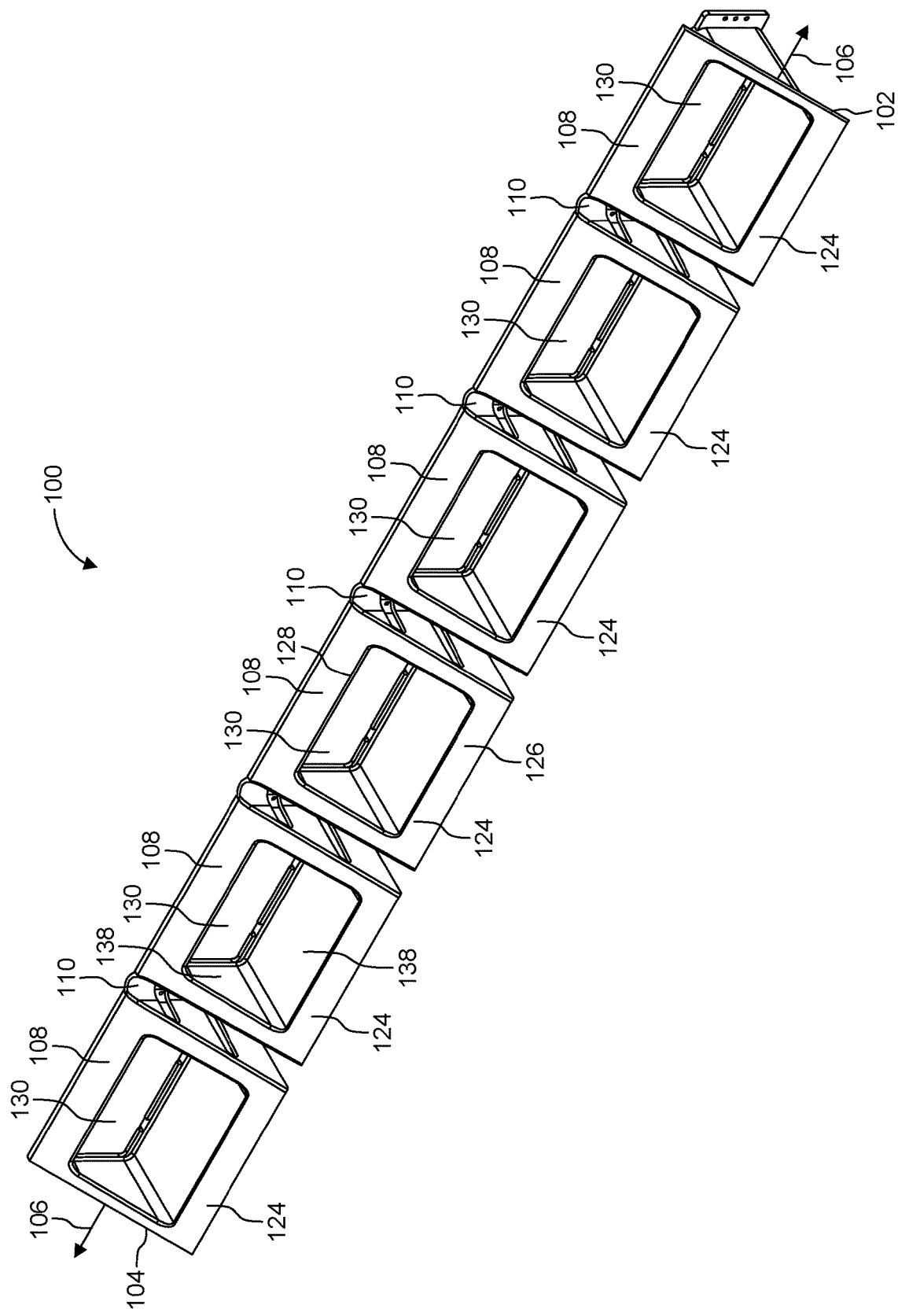
FIG. 1 is a perspective view of an example light bar in accordance with the present disclosure.

The present disclosure is directed light bars, and systems and vehicles employing such light bars. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to FIGS. 1, 2, 4 and 5, an example light bar 100 in accordance with the present disclosure is depicted. In each of these Figures, the light bar 100 is shown in a relaxed or unflexed configuration.

The light bar 100 extends from a first end 102 to a second end 104. In the relaxed configuration, the light bar 100 extends along a reference line 106.

The light bar 100 includes a plurality of modules 108. In this example, there are six modules 108; however, the light bar can include more or fewer than six modules. In this example, the modules 108 are all of identical construction. In other examples, the modules need not be identical. In this example, the modules 108 are arranged in a single row. In other examples, the modules can be arranged in other arrangements, such as a two-dimensional array of modules.

A flexibly resilient coupler 110 (coupler), couples each pair of adjacent modules 108 in the light bar 100. Thus, in this example, there are six modules 108 and five couplers 110 that serially couple the six modules 108 to form the light bar 100.

The couplers can comprise any suitable construction and material. In this example, each coupler comprises a hinge made of a plurality (three) of strips 112 of flexibly resilient material attached at one end 116 of the housing 114 of one of the modules 108, and attached at another end 118 to the housing 114 of an adjacent module 108.

In some examples, the module housings and couplers are integrally formed, e.g., co-molded, as a unitary construction of a light bar 100. In other examples, the modules of a given light bar are constructed separately from one another and subsequently coupled together with the couplers.

Each coupler 110 is adapted to pivot about a primary hinge axis 120 that is perpendicular to the reference line 106. In some examples, each coupler 110 is adapted to resiliently pivot about a secondary hinge axis 122 that passes through the coupler 110, is parallel to the reference line 106, and perpendicular to the primary hinge axis 120. Thus, in some examples, the couplers 110 provide the modules 108 with two degrees of flex freedom relative to their relaxed configuration.

Each module 108 also includes a light propagation face 124. The light propagation face 124 includes an affixation surface 126 surrounding a light propagation area 128. In some examples, the light propagation area 128 is an opening in the propagation face 124, i.e., is devoid of material. In some examples, the light propagation area 128 includes a transparent material, such as a lens, a light filter, or a transparent cover for protection.

Each housing 114, together with the corresponding light propagation face 124, defines a bay 130 of a module 108. A light emission component 132 mounts to the housing 114 of each module 108. The light emission component 132 includes one or more light emitters.

The light emitters are positioned relative to the bay 130 and the propagation face 124 such that light emitted by the light emitters propagates at least primarily in a direction 134 (FIG. 3), which is perpendicular to a vertical side 135 (FIG. 3) of the module. Thus, light emitted by the light emitters propagates through the light propagation area 128.

Optionally, each module 108 includes a lens component 136 that includes one or more lenses and/or filters for adjusting beam width and/or other beam characteristics of the light emitted by the light emitters. In some examples, the lens component 136 is housed in and/or mounted to one or more interior surfaces of the housing 114 that define the corresponding bay 130.

In some examples, one or more interior surfaces of the housing 114 of a given module 108 is/are optically configured to adjust light emitted by the light emitters before it propagates through the propagation face 124. For example, interior surfaces 138 of the housing 114 can include light reflectors or light reflective materials.

Figure 2:
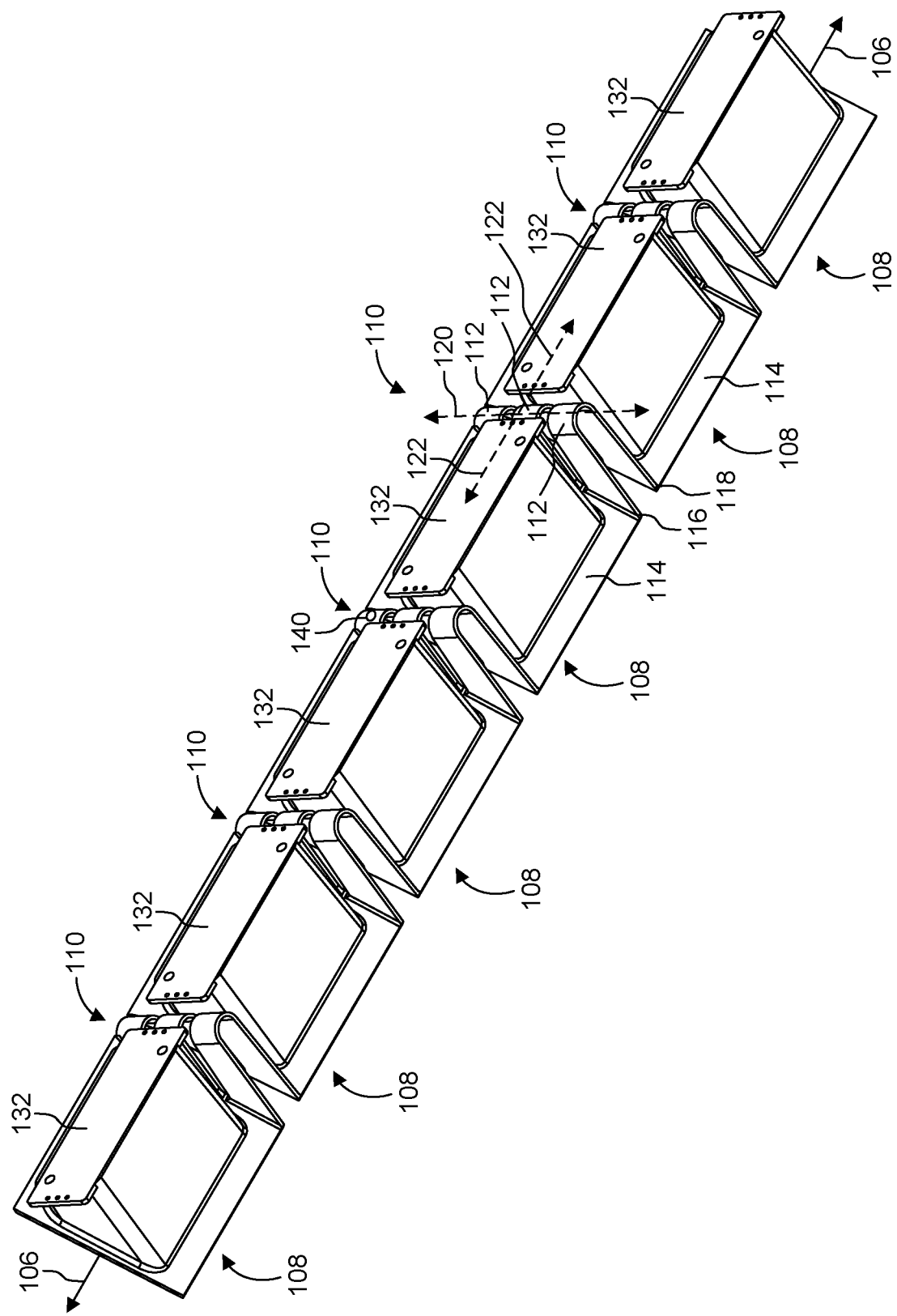
FIG. 2 is a further perspective view of the light bar of FIG. 1.

The light bar can include a signal transceiving node, represented schematically as reference number 140 in FIG. 2. In some examples, the signal transceiving node 140 can be positioned equidistant or substantially equidistant between the ends 102 and 104 of the light bar 100. The signal transceiving node 140 can be hardwired to a controller that controls light emission of the light bar 100. In other examples, the signal transceiving node 140 is adapted as a signal receiver and/or transmitter for receiving and/or providing signals from and to, respectively, a controller via a wireless communication network. In some examples, the transceiving node includes separate conductors and/or defines separate conductive paths for transmitting signals to the controller and receiving signals from the controller.

The signal transceiving node 140 is electrically coupled to each of the modules 108. In some examples, one or more conductors are routed through the flexible couplers 110 to electrically couple the signal transceiving node 140 to each of the light emitters of each of the modules 108. For example, conductive wires or leads can be embedded in one or more of the strips that make up the flexible couplers 110.

In some examples, one or more of the modules 108 can be removed from the light bar 100 without impacting the controllability of the remaining modules 108. For example, one or more of the modules 108 can be severed from the light bar 100, e.g., by cutting the corresponding coupler(s) 110, with the controller still being able to communicate, via the signal transceiving node 140, with the module or modules 108 remaining, and thereby control light emission by the remaining module or modules.

In some examples, the couplers 110 include complementary mating features (e.g., plugs and sockets) that allow corresponding modules to be detached and reattached to each other as desired. The mating features can include one or more conductive elements for maintaining electrical connectivity between adjacent modules when the adjacent modules are mated to each other with the mating features of the coupler 110 positioned between them. The mating features can be adapted to minimize any interference with the coupler's flex freedom.

In some examples, a controller or other electronic component is adapted to detect, via a signal provided from the light bar through the signal transceiving node 140, the number of modules 108 contained in the light bar and/or a configuration of the modules 108 contained in the light bar. The controller can then provide light emission control signals to the light bar 100 based on (e.g., specific to) the number and/or configuration of modules detected.

Figure 3:
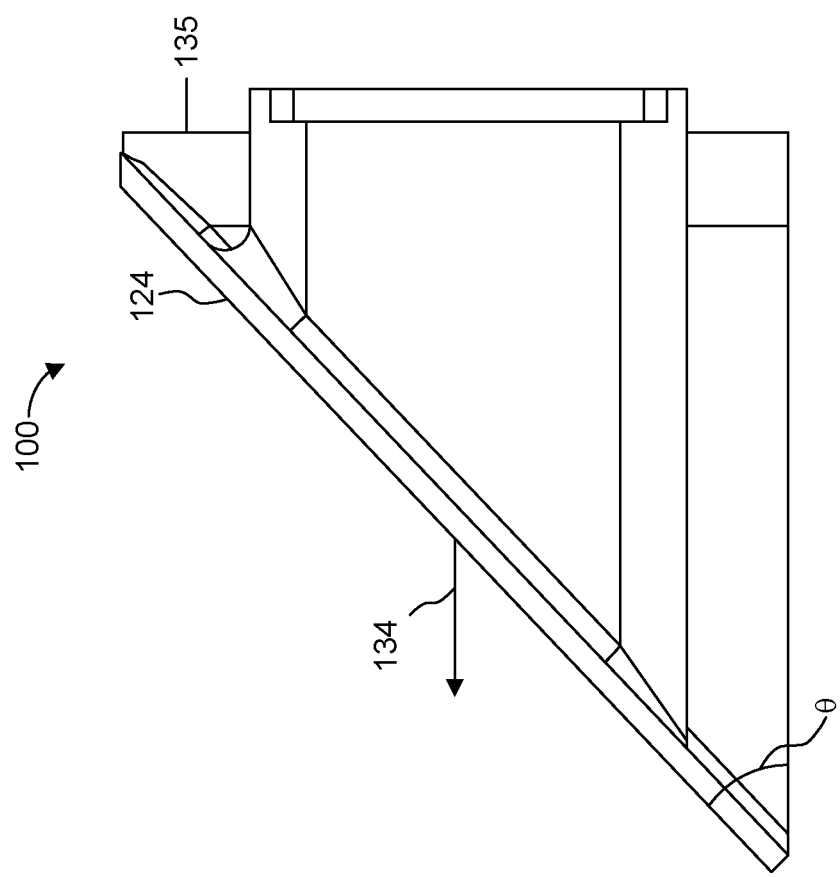
FIG. 3 is a side end view of the light bar of FIG. 1.
Figure 4:
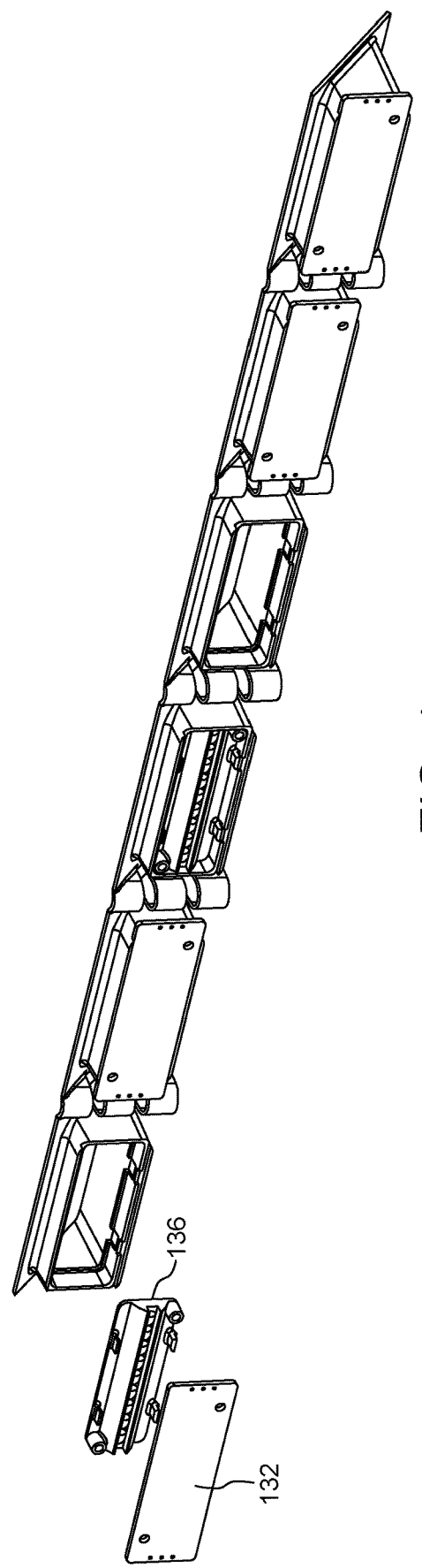
FIG. 4 is a partially exploded view of the light bar of FIG. 1.
Figure 5:
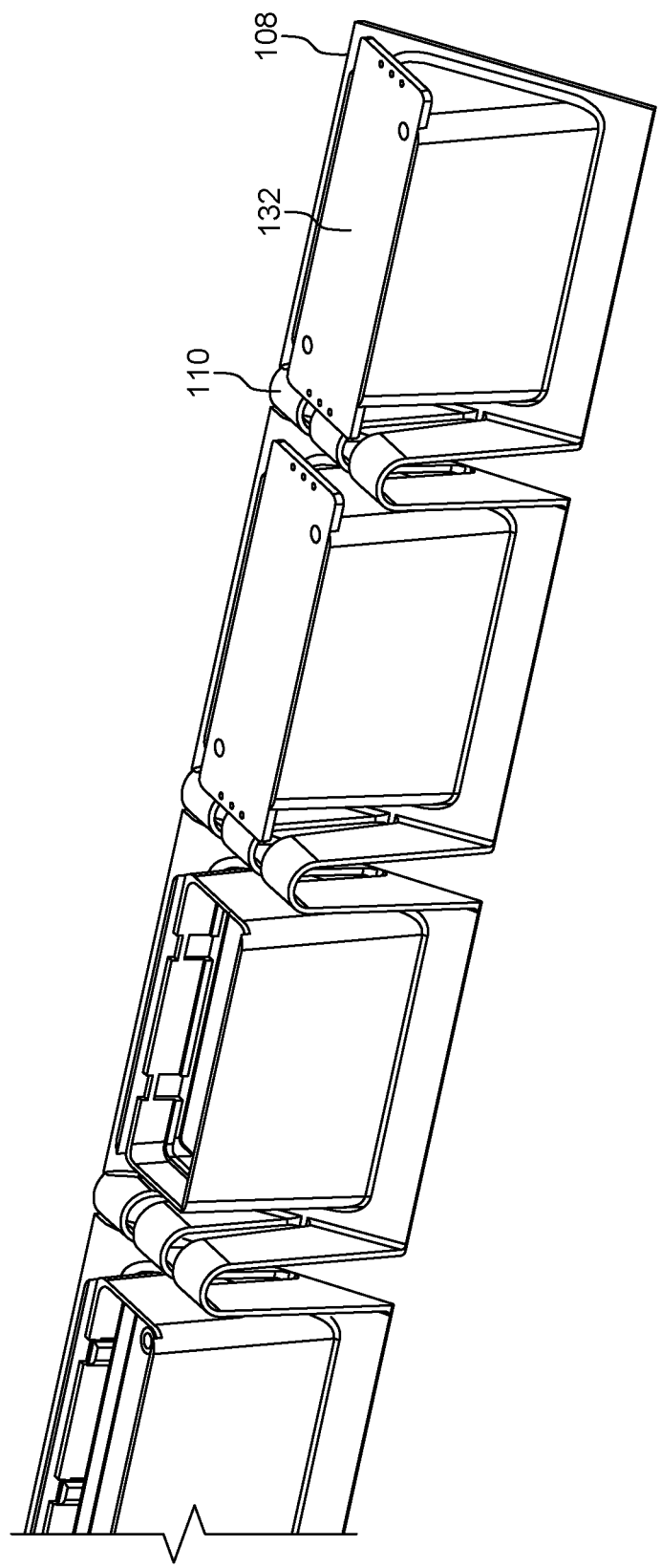
FIG. 5 is further perspective view of a portion of the light bar of FIG. 1.

Referring to FIG. 3, it should be appreciated that a cross-section of the light bar 100 perpendicular to the reference line 106 (FIG. 2) and through one of the modules 108 has a perimeter that defines or substantially defines a right triangle or a right triangle with one or more rounded corners, with the primary propagation direction 134 being perpendicular to the vertical side of the triangle.

More generally, for a given propagation face, in at least some examples the primary propagation direction 134 is selected to be parallel or substantially parallel to a surface upon which the vehicle or other object having an installed light bar 100 is positioned. Thus, when the light bar 100 is affixed to a surface of an object that is non-perpendicular to the surface upon which that object is positioned, the primary propagation direction is non-perpendicular to the propagation face.

In the example depicted in FIG. 3, one of the acute angles θ of the right triangle is 45°. In the case of non-triangular cross-section or a non-right triangular cross-section, the angle represented by θ can be considered an angle defined by the module that is closest to the propagation face of the module or closest to the affixation surface of the module.

The size of the angle θ can be selected according to a class or group of classes of a vehicle or a type of vehicle surface through which the emitted light is to propagate. In some examples, θ can be anywhere from e.g., 15° to 75°, or alternatively outside of this range.

Figure 6:
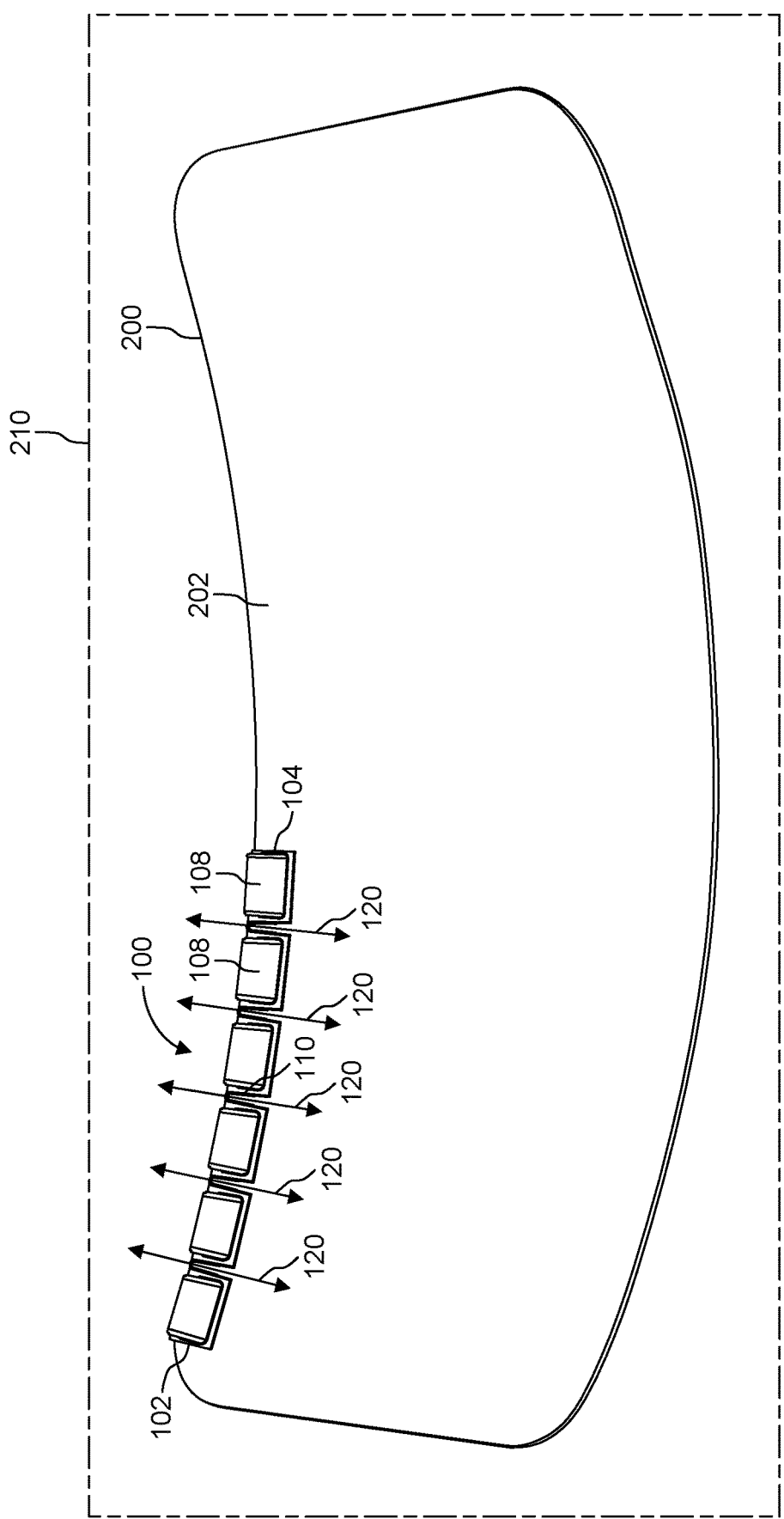
FIG. 6 is a view of an example vehicle windshield with the light bar of FIG. 1 affixed thereto.
Figure 7:
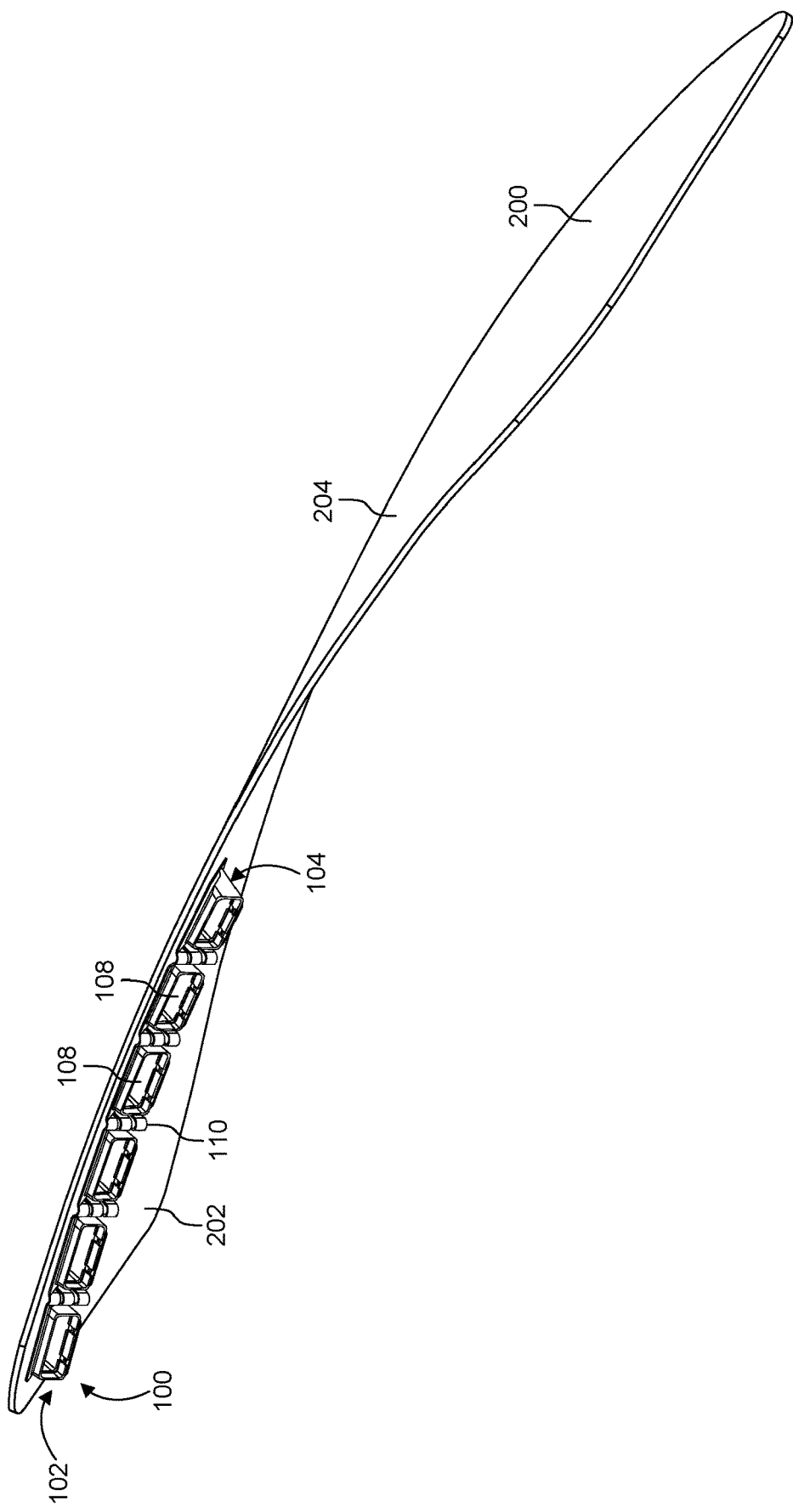
FIG. 7 is a further view of the windshield and light bar of FIG. 6.
Figure 8:
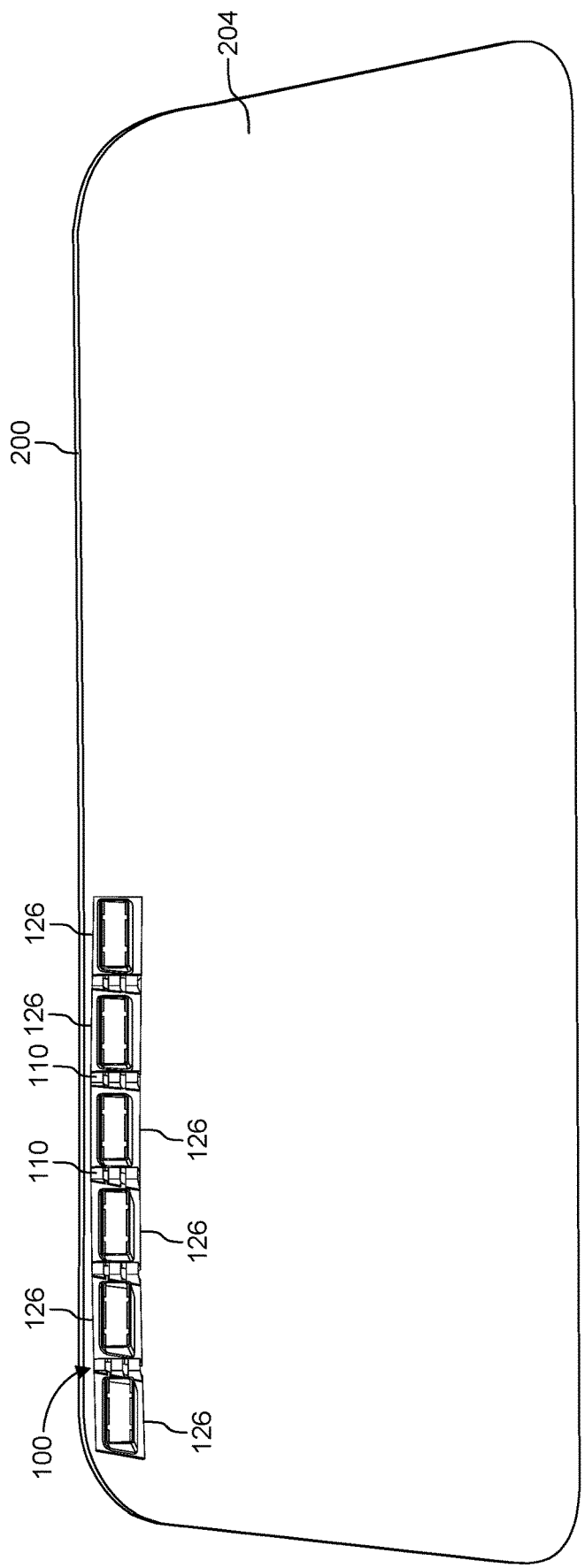
FIG. 8 is a further view of the windshield and light bar of FIG. 6.

Referring now to FIGS. 6-8, the light bar 100 is shown mounted to a transparent windshield 200 of a vehicle 210, the vehicle 210 being shown schematically. The depicted position of the light bar 100 relative to the windshield 200 is not limiting. It should be appreciated that the light bar 100 can be affixed to any suitable portion of the concave surface 202 or the opposing convex surface 204 of the windshield 200. It should also be appreciated that the concave surface 202 of the windshield 200 can more generally represent any window or any surface of a vehicle or other object. In addition, in some examples, the light bar can be configured to extend along an entire dimension of a windshield or other window of a vehicle, such as a windshield's entire horizontal length.

In the example depicted, the affixation surfaces 126 of the modules 108 of the light bar 100 are affixed (e.g., with adhesive) directly to the concave surface 202 of the windshield 200.

A first degree of flex freedom of the light bar 100 is illustrated in FIG. 6, the light bar 100 curving between its ends 102 and 104 relative to the relaxed configuration (FIG. 1) and adopting or substantially adopting the local curvature of the concave surface 202 of the windshield 200. In this example, the curvature primarily depicted corresponds to a pivoting of the modules 108 about the respective primary hinge axes 120.

A second degree of flex freedom of the light bar 100 is illustrated in FIG. 7, the light bar 100 curving between its ends 102 and 104 relative to the relaxed configuration (FIG. 1) and adopting or substantially adopting the local curvature of the concave surface 202 of the windshield 200. In this example, the curvature primarily depicted corresponds to a pivoting of the modules 108 about the respect secondary hinge axes 122 (FIG. 2).

The light bar 100 thus adopts a curvature that includes pivoting about both the primary and secondary hinge axes at the same time.

Figure 9:
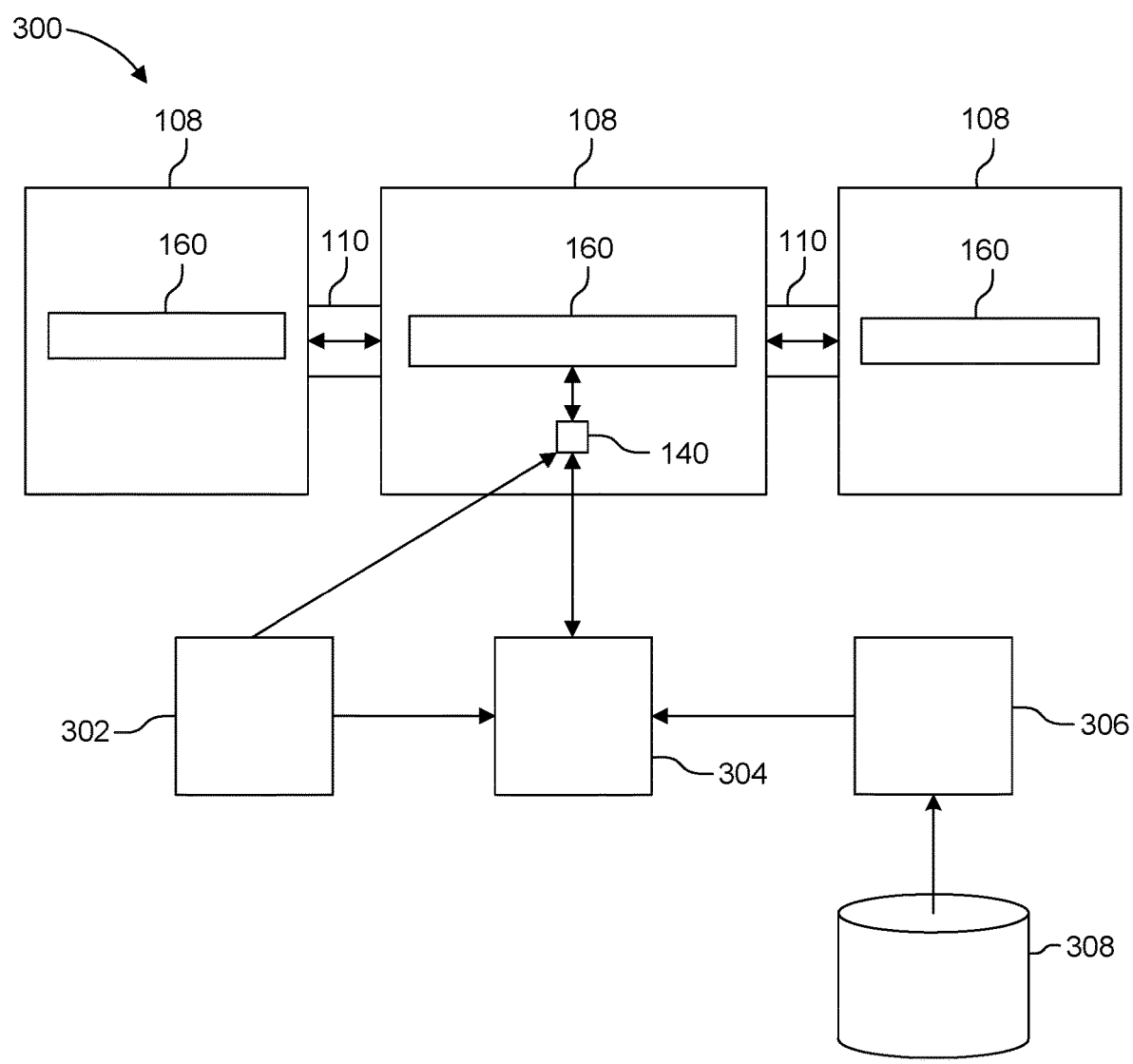
FIG. 9 is a schematic view of an example system in accordance with the present disclosure, the system including a light bar in accordance with the present disclosure.

Referring now to FIG. 9, an example system 300 includes a light bar having a plurality of the modules 108 electrically and electronically interconnected by flexible couplers 110.

Each of the modules 108 includes a light emission unit 160 having one or more light emitters powered by a power supply 302. The power supply is electrically connected to the light bar via a signal transceiving node 140 located on or in one of the modules 108, or via another wired or wireless connection point.

A controller 304 (also powered by the power supply 302) controls light emission by the light emission units 160, the controller 304 providing control signals to the modules 108 via the signal transceiving node 140.

In some examples, the controller receives inputs from one or more processors 306. The one or more processors 306 execute computer-readable instructions stored on a memory 308. The processed instructions can cause the controller to send control signals corresponding to a light emission pattern stored on a non-transitory computer readable medium (e.g., a memory) 308. More than one light emission pattern (e.g., a flashing pattern) can be stored on the memory 308, and the particular emission pattern retrieved can depend on one or more variables or parameters.

One such parameter that can dictate or partially dictate a light emission pattern retrieved from the memory 308 and provided to the light bar via the controller 304 is the type of vehicle or other object to which the light bar is affixed. Another such parameter is the particular surface of the vehicle or other object to which the light bar is affixed. Another such parameter is the number of modules 108 in the light bar. In some examples the number of modules 108 in the light bar is a parameter detectable by the controller 304 (or another detecting element of the system 300). For example, the controller 304 can send an interrogation signal to the light bar and receive in a response a signal representing the number of modules 108 that are present. Alternatively, the signal representing the number of modules 108 can be provided directly or indirectly to the processor 306, which retrieves an emission pattern from the memory 308 based on the signal received.

The parameters enumerated are not exhaustive. It should be appreciated that, depending on the parameter, the parameter can be retrieved (by the processor 306 and/or the controller 304) from the light bar, from the memory 308, or directly from a user input. For example, the memory 308 can be dedicated to a particular vehicle and store parameters related to that vehicle. In another example, a user inputs, via an input device (e.g., a microphone, a key board, a touch screen, etc.) a parameter, such as the particular surface (e.g., windshield) and/or a particular position on the surface, to which the light bar is affixed.

The controller 304 and/or the processor 306 can also be dedicated to a particular vehicle and positioned on or in the vehicle but remotely from the light bar itself. In other examples, one or more of the power supply 302, the controller 304, the processor 306, and the memory 308 are physically included in the light bar itself.

A method of affixing a light bar having a plurality of modules 108 interconnected by couplers 110 and each including one or more light emitters in accordance with the present disclosure includes: selecting a desired number of the modules 108 for the light bar; optionally, depending on the selected desired number, removing one or more of the modules from the light bar and/or connecting, via one or more couplers having electrically communicative mating features, additional modules to the light bar; pivoting one or more of the modules about one or more degrees of flex freedom; affixing an affixation surface of each of the one or more modules of the light bar to a curved surface; optionally, connecting the one or more modules to a light emission controller; and, optionally, controlling light emission of the one or more light emitters. In some examples, the controlling depends at least partially on the number of modules included in the light bar.

As illustrated, the various embodiments described herein can include a system memory. The memory can provide non-volatile, non-transitory storage for the light bar or system. The memory can store instructions that are executed by the controller to perform one or more functions or acts, such as those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A light bar having a relaxed configuration and a flexed configuration and comprising:
   a plurality of modules, each of the modules including:
   a housing defining an interior bay, the housing including a front wall and a rear wall connected to the front wall at an acute angle; and
   at least one light emitter connected to a forward facing rear interior surface of the rear wall, the at least one light emitter positioned to emit light that is visible through the front wall; and
   one or more resiliently flexible couplers, each of the one or more resiliently flexible couplers including a pair of spaced apart strips forming a hinge, the spaced apart strips coupling a pair of adjacent modules of the plurality of modules, with an exterior, forward facing front surface of the front wall of each of the plurality of modules being an affixation surface adapted to be affixed to a curved surface when the light bar is in the flexed configuration.

2. The light bar of claim 1, wherein at least one of the plurality of modules cannot be directly affixed to the curved surface when the light bar is in the relaxed configuration.

3. The light bar of claim 1, wherein the one or more resiliently flexible couplers have at least two degrees of flex freedom.

4. The light bar of claim 1, including N of the modules and N-1 of the resiliently flexible couplers, wherein N is an integer greater than or equal to 3.

5. The light bar of claim 1, wherein each of the one or more resiliently flexible couplers includes a hinge.

6. The light bar of claim 1, wherein each of the one or more resiliently flexible couplers includes a flexible and electrically conductive material.

7. The light bar of claim 1, wherein each of the one or more resiliently flexible couplers includes an electrically conductive element embedded in an electrical insulator.

8. The light bar of claim 1, wherein the plurality of modules are serially arranged in a single interconnected row of the modules.

9. The light bar of claim 8, wherein the plurality of modules define a reference line when the light bar is in the relaxed configuration, and wherein the one or more resiliently flexible couplers have at least two degrees of flex freedom relative to the reference line.

10. The light bar of claim 9, wherein a first of the at least two degrees of flex freedom allows at least a first of the modules to be pivoted away from the reference line by an angle that is greater than 0 degrees and at least 30 degrees.

11. The light bar of claim 10, wherein a second of the at least two degrees of flex freedom allows at least the first of the modules to be pivoted away from the reference line by an angle that is greater than 0 degrees and at least 10 degrees.

12. The light bar of claim 1, wherein the affixation surface includes an adhesive.

13. A vehicle comprising:
   a curved surface; and
   a light bar, the light bar having a relaxed configuration and a flexed configuration and including:
   a plurality of modules, each of the modules including a housing defining an interior bay, the housing including a front wall, and a rear wall connected to the front wall at an acute angle, the rear wall supporting at least one light emitter positioned to emit light that propagates through a light propagation face of the front wall, the light propagation face coinciding with an affixation surface of the module; and
   one or more resiliently flexible couplers, each of the one or more flexibly resilient couplers including a pair of spaced apart strips forming a hinge, the spaced apart strips coupling a pair of adjacent modules of the plurality of modules,
   wherein the light bar is in the flexed configuration and all of the plurality of modules are directly affixed to the curved surface at their affixation surfaces.

14. The vehicle of claim 13, further comprising a controller adapted to control a light emission pattern of the light emitters of the plurality of modules.

15. The vehicle of claim 13, wherein affixation points of the plurality of modules to the curved surface define a curve, and wherein the curved surface is a windshield of the vehicle.

16. The vehicle of claim 15, wherein the curve defines no more than one radius of curvature.

17. The vehicle of claim 15, wherein the curve defines multiple radii of curvature.

18. A system comprising:
a light bar having a relaxed configuration and a flexed configuration and including:
a plurality of modules, each of the modules including a housing defining an interior bay, the housing including a front wall and a rear wall connected to the front wall at an acute angle and at least one light emitter connected to a forward facing rear interior surface of the rear wall, the at least one light emitter positioned to emit light that is visible through the front wall; and
one or more resiliently flexible couplers, each of the one or more resiliently flexible couplers including a pair of spaced apart strips forming a hinge, the spaced apart strips coupling a pair of adjacent modules of the plurality of modules, each of the plurality of modules being adapted to be directly affixed at a forward facing front affixation surface of the front wall of each module to a curved surface when the light bar is in the flexed configuration;
a controller operatively linked to the light bar and adapted to control a light emission pattern of the light emitters of the plurality of modules based in part on a detected number of the plurality of modules;
a non-volatile, non-transitory storage; and
a processor, the processor adapted to execute computer readable instructions stored on the storage, the executed instructions causing the controller to provide light emission control signals to the plurality of modules to control the light emission pattern of the light emitters of the plurality of modules.

* * * * *